United States Patent [19]

Kerfoot

[11] 3,738,176
[45] June 12, 1973

[54] TRANSPARENT LIQUID LEVEL INDICATOR

[76] Inventor: William Kerfoot, P.O. Box A, Berryville, Va. 22611

[22] Filed: July 26, 1971

[21] Appl. No.: 166,043

Related U.S. Application Data

[63] Continuation-in-part of Ser. No. 15,244, Feb. 27, 1970, Pat. No. 3,594,906.

[52] U.S. Cl. .................. 73/425.4 R, 33/126.4 R
[51] Int. Cl. .............................................. G01n 1/10
[58] Field of Search ............... 33/126.4 R, 126.7 R; 73/425.4 R, 323; 285/DIG. 12, 16

[56] References Cited
UNITED STATES PATENTS

| 3,453,886 | 7/1969 | Avrea | 73/323 |
|---|---|---|---|
| 2,343,168 | 2/1944 | Bickle | 33/126.7 R |
| 2,766,518 | 10/1956 | Kostanzo | 285/DIG. 12 |
| 873,300 | 12/1907 | Cranston | 285/DIG. 12 |
| 2,876,548 | 3/1959 | Banker | 33/126.4 R |

FOREIGN PATENTS OR APPLICATIONS

| 568,527 | 12/1923 | France | 33/126.4 R |

Primary Examiner—Donald O. Woodiel
Assistant Examiner—Daniel M. Yasich
Attorney—Lawrence J. Winter

[57] ABSTRACT

The present invention relates to a transparent liquid level indicator in which a transparent casing is disposed within a tank or reservoir and is provided with a movable plunger. The transparent casing is of a tubular configuration and is made separate from a housing to which it is secured so that the tubular member can be made of various dimensions and mass-produced in an economical manner. Biasing means normally maintain a movable plunger disposed in the housing in an uppermost position, and when the handle is depressed, the plunger is provided with a piston on its lower end which moves downwardly in the tubular member below a liquid inlet port. The liquid in the tank then enters the casing, and the handle is released so the biasing means cause the handle to move back to its uppermost position to trap liquid in the transparent tubulr member. The liquid trapped in the tubular member indicates the level of the liquid in the reservoir when the tubular member and housing is removed from the reservoir.

2 Claims, 3 Drawing Figures

PATENTED JUN 12 1973 3,738,176
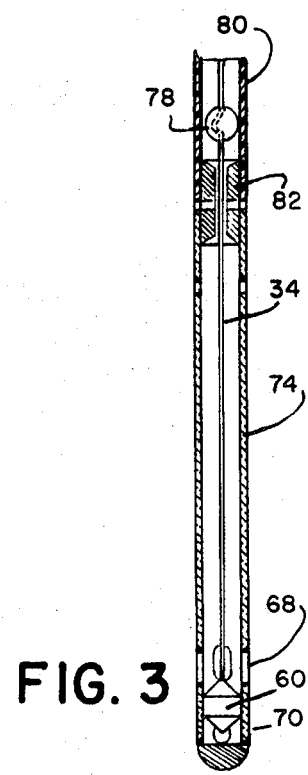
INVENTOR
WILLIAM A. KERFOOT
BY Lawrence J. Winter
ATTORNEY

TRANSPARENT LIQUID LEVEL INDICATOR

The present invention is a continuation-in-part of my application Ser. No. 15,244 filed Feb. 27, 1970 and now U.S. Pat. No. 3,594,906.

In accordance with the present invention, a liquid level gauge or indicator is provided in which the housing is separate from the lower tubular portion and is made of extruded transparent plastic material or glass material so that the gauge can be mass-produced for different size vehicles in an economical manner.

It is an object of the present invention to provide a liquid level indicator in which all of the parts can be mass-produced since they are identical in configuration while, at the same time, the tubular member embodied in the device can be made of extruded plastic material or glass material and may have its overall length of different dimensions and the housing of the device is provided with a recess therein into which the upper end of the tubular member fits and is secured thereto so as to provide an economical liquid level gauge for various size engines, such as trucks, aircraft, in-board boat engines, motorcycles, as well as different size cars, including the compact car, the small imported vehicles, as well as normal size cars and large size automobiles.

It is another object of the present invention to provide a liquid level gauge for indicating the level of oil in the crankcase of various size vehicles in which the liquid level gauge has all of its parts of identical configuration, except that the length of the tubular member embodied in the device may be of a different length to compensate for different size oil reservoirs in different size vehicles.

It is another object of the present invention to provide a liquid level gauge in which the tubular member embodied therein is made of extruded plastic material which is much more economical than making it of a molded plastic material, and in which the tubular member of the device is formed as a distinct part from the housing so that it can also be made of glass material where extremely high oil temperatures are encountered in a hot running engine.

It is yet another object of the present invention to provide a liquid level gauge having a separate tubular member therein, which is secured to the housing of the device so that an oil level may be measured in a crankcase of a vehicle engine under extremely hot temperatures and under extremely dirty oil conditions so that the device will function to give an accurate reading despite adverse chemical reactions and temperature conditions.

A further object of the present invention is to provide a liquid level measuring device in which it is not necessary to normally wipe off the measuring device, as must be done in the conventional and standard dip-stick that is used at the present time in automobiles.

It is still a further object of the present invention to provide a transparent, elongated, hollow casing that can be disposed within a conventional oil filler tank, for example, such as that used in automobiles, and can be used to measure the liquid level of the oil therein, without requiring any extensive changes to the automobiles now in present-day use.

It is yet another object of the present invention to provide a liquid level indicating device having biasing means for normally positioning the movable plunger of the device in an uppermost position, so that the lower end of the casing is normally out of communication with the liquid level in the tank, and when it is desired to permit the liquid level of the tank to seek its level within the casing, the handle is depressed so that the plunger moves downwardly and opens up the oil inlet ports in the casing to permit the oil to flow therein. Thereafter, the handle is released and biasing means return the handle to its normal upright position to trap a sample of the oil in the liquid level indicator casing. Thereafter, the indicator device is removed from its position within the interior of the tank being measured, and the transparent casing permits the observer to readily determine the level of the liquid in the tank as well as see the cleanliness of the liquid therein.

Various other objects and advantages of the present invention will be readily apparent from the following detailed description when considered in connection with the accompanying drawing forming a part thereof and in which FIG. 1 is a side elevational view of the present embodiment of the invention, illustrating the liquid level indicator in its depressed position.

FIG. 2 indicates a V-8 engine of a vehicle with the liquid level gauge disposed in the crankcase with part of the engine broken away to illustrate its position therein.

FIG. 3 is a partial view of the liquid level device illustrating a modification of the device shown in FIG. 1.

Referring to the drawing, the reference numeral 10 generally designates a transparent liquid level gauge or indicator device embodied in the present invention.

The indicator device is shown in FIG. 2 disposed within or hanging downwardly into a liquid tank or crankcase of an engine 12 with the liquid level being indicated by the dotted line 14 therein. It will be noted that the engine block is provided with an opening so that the device may be removed entirely from the crankcase.

The indicator is provided with a cylindrical housing 16 made of molded plastic material having a lower annular flange 18 adapted to seat against the wall of the vehicle crankcase. The upper end of the housing is provided with external threads 20 thereon adapted to receive an internally threaded cap 22 thereover, which cap is further provided with a central opening 24 therein, through which extends a curved handle 26 for inserting a finger therethrough when the device is to be operated. The finger-grip handle 26 terminates in a vertical shaft portion 28 and is provided with an enlarged diameter portion 30, which normally is disposed in an uppermost position in the housing by a biasing spring 32 disposed in the housing below the enlarged diameter portion 30. Thus, the biasing spring, except when it is pushed downwardly as shown in FIG. 1 by a person using a finger-grip handle to force it downwardly, will normally bear against or seat against the threaded cap 22. The lower end of the shaft 28 is provided with an elongated metal rod 34, which rod 34 is provided with a piston 60 on its lower end having conical tapered end portions 62 and 64.

The lower end of the housing 16 is provided with a central cylindrical recess 36 therein and a transparent tubular member has its upper end extending into the recess. The transparent tubular member shown in FIG. 1 is made of extruded plastic material and has a plurality of upper oil inlet ports 68 therein disposed around its circumference and a plurality of lower inlet ports 70 disposed circumferentially in the lower portion thereof.

The tubular member 38 is made of an extruded plastic material which will withstand oil temperatures of 300° F. and of a plastic material that will also not be affected by any ingredients in the oil.

The housing 16 may be made of molded plastic material not requiring such high temperature standards since it is never immersed in the oil.

The handle 26 and the shaft 28 may be made of plastic or metal material as desired since these parts, too, do not ever become immersed in the oil.

The tubular member 38 is extruded because this is the most economical way of making it and due to the many different sizes of crankcases for imported cars, compact cars, normal size cars and large size cars; and for motorcycles, motorboats, trucks and the like, the tubular member 38 can be readily extruded to any desired overall length. This eliminates the need for making a separate mold if the housing 16 and the tubular member 38 which is immersed in the oil were made of a single molded piece or as a single unit. The upper end of the extruded tubular member 38 is secured within the recess in the housing 16 by any suitable means such as epoxy adhesives or other adhesives commercially available.

The lower end of the tubular member 38 has secured thereto by any suitable adhesive material a closure cap 72 which is inserted into the lower end thereof.

In operation, when it is desired to measure the liquid level within the tank or crankcase of a vehicle, the device is moved from its normal uppermost position, at which time the enlarged portion 30 bears against the cap 22, and the finger grip handle 26 is moved downwardly by the operator to overcome the force in the biasing spring 32, so that the piston 60 is moved downwardly in the tubular member 38 below the uppermost oil inlet ports 68.

At this time the oil will rush into the oil inlet ports 68, as indicated by the arrows therein, and will rise to the oil level 14 in the liquid level gauge.

Thereafter, the finger grip handle 26 is released and moves upwardly so that the enlarged portion 30 bears against the cap 22. This causes the piston 60 to move upwardly so as to close off the oil ports 68 and trap the oil in the upper portion of the tubular member 38. Thereafter, the entire device is removed from the opening in the crankcase and an observer looks through the transparent tubular member and the liquid level is clearly indicated in the device.

The side of the tubular member 38 is provided with calibrations to indicate the oil level is at a proper operating level, or whether it needs to be refilled. Thereafter, the device is again placed back in the crankcase and the device is ready for use again at a later date. It will be noted that with the present device, the party using it does not have to wipe the so-called liquid level device or dip-stick. The provision of the lower ports 70 in the tubular member 38 to permit the oil to be discharged from the gauge through ports 70 when the finger grip handle is depressed in the tubular member.

Referring to the embodiment of the invention shown in FIG. 3, this is substantially the same as that described in connection with FIGS. 1 and 2, except that the tubular member 74 is made of glass that will withstand the maximum oil temperature of the oil used in an engine. The rod 34 is provided with a ball guide 78.

The glass 74 forming the portion of the tubular member that is immersed in the oil is joined to the upper portion of an extruded or metal tubular member 80 by a splicer member 82 with suitable adhesive material being disposed between the outer surface of the member 82 and the inner surface of the adjacent portions of the upper tubular member 80 and the lower tubular member 74. The rod 34 extends through a central opening in member 82. The upper portion 80 of the tubular member may also be made of metal material, plastic, or any other material as desired and is preferably inserted in the recess of housing 16, as in FIG. 1.

Thus, with the present invention a liquid level device is provided which can be made of identical parts, and is provided with an extruded plastic tubular member that can be extruded in predetermined lengths so that the device can be mass-produced for different size vehicles requiring different length devices and requiring different calibrations.

The present invention further provides a novel liquid level device in which the lower portion of the device that is immersed in the oil can be made of glass material readily secured to the other standard portions of the device to withstand the hottest oil temperatures so that in a hot running engine there would be no inadvertant drooping or bending of the plastic material so that if the oil measuring device is disposed in a crankcase at a 45° angle, the lower end will not inadvertantly bend at excessively high temperatures and there will be no inacurate readings of the device.

Inasmuch as various changes may be made in the relative arrangement, form and location of the parts without departing from the spirit and scope of the invention, it is not meant to limit the invention excepted by the appended claims.

I claim:

1. An indicator and sampling device comprising a plastic cylindrical housing, a threaded portion on its upper end, a cap with a central opening threaded on said end, an annular rim in said housing adjacent its lower portion, cylindrical recess means in the bottom of said housing, a separate transparent extruded plastic tube inserted into said recess, adhesive means securing said tube to said recess means, said tube having vertically spaced oil inlet and outlet parts in its lower end and a bottom therein, a slidable plunger member disposed in said housing, a rod extending downwardly into said tube and secured to said plunger member, a piston on the lower end of said rod to seal against the inner surface of said tube, said plunger member having an enlarged diameter portion, a biasing spring mounted on said plunger member between said enlarged diameter portion and said annular rim to normally urge said plunger member, handle means on said plunger member for pushing it downwardly, said piston being disposed above said uppermost oil inlet portions when said biasing spring maintains said diameter portion against said cap, and being disposed below said lower ports when said biasing spring is depressed, said tube being made of two separate parts fastened together by internal splicer means and including an upper extruded plastic tube portion and a lower glass portion.

2. An indicator and sampling device comprising a plastic cylindrical housing, a threaded portion on its upper end, a cap with a central opening threaded on said end, an annular rim in said housing adjacent its lower portion, cylindrical recess means in the bottom of said housing, a separate extruded plastic tube inserted into said recess made of two separate portions, an upper plastic portion and a lower tube portion being of glass material, adhesive means securing said plastic tube to said recess means, an annular elongated splicer member extending into both tube portions with adhesive means securing said tube portions together, said glass tube having vertically space oil inlet and outlet ports in its lower end and a bottom therein, a slidable plunger member disposed in said housing, a rod extending downwardly into said tube and secured to said plunger member, a piston on the lower end of said rod to seal against the inner surface of said tube, said plunger member having an enlarged diameter portion, a biasing spring mounted on said plunger member between said enlarged diameter portion and said annular rim to normally urge said plunger member, handle means on said plunger member for pushing it downwardly, said piston being disposed above said uppermost oil inlet portions when said biasing spring maintains said diameter portion against said cap, and being disposed below said lower ports when said biasing spring is depressed.

* * * * *